United States Patent [19]

Siroki

[11] Patent Number: 5,428,477
[45] Date of Patent: Jun. 27, 1995

[54] OPTICAL ISOLATOR OPERATING INDEPENDENT OF POLARIZATION OF AN INCIDENT BEAM

[75] Inventor: Kenichi Siroki, Sendai, Japan

[73] Assignee: Tokin Corporation, Miyagi, Japan

[21] Appl. No.: 156,871

[22] Filed: Nov. 19, 1993

Related U.S. Application Data

[63] Continuation of Ser. No. 898,033, Jun. 12, 1992, abandoned.

[30] Foreign Application Priority Data

Jun. 14, 1991 [JP] Japan ................................. 3-169053

[51] Int. Cl.$^6$ .......................... G02B 5/30; G02B 27/28
[52] U.S. Cl. .................................. 359/484; 359/487; 372/703
[58] Field of Search ............... 359/281, 282, 283, 484, 359/487, 497; 372/703

[56] References Cited

U.S. PATENT DOCUMENTS

| 4,178,073 | 12/1979 | Uchida et al. | 359/484 |
| 4,974,944 | 12/1990 | Chane | 359/497 |
| 5,227,623 | 7/1993 | Heffner. | |

FOREIGN PATENT DOCUMENTS

| 55-6326 | 1/1980 | Japan | 359/484 |
| 55-113020 | 9/1980 | Japan | 359/484 |
| 57-62024 | 4/1982 | Japan | 359/484 |
| 2-44310 | 2/1990 | Japan | 359/484 |
| 4-51214 | 2/1992 | Japan | 372/703 |
| 4-73712 | 3/1992 | Japan | 372/703 |
| 4-264516 | 9/1992 | Japan | 372/703 |
| 5-34632 | 2/1993 | Japan | 372/703 |

OTHER PUBLICATIONS

Journal of Optical Communications 12 (1991) 1, Y. Namihira, pp. 2–9; "Fiber Length Dependence of Polarization Mode Dispersion Measurements in Long-Length Optical Fibers and . . . ".

Primary Examiner—Martin Lerner
Attorney, Agent, or Firm—Frishauf, Holtz, Goodman & Woodward

[57] ABSTRACT

A polarization-independent optical isolator comprises three Faraday rotators and four birefringent elements. An optical arrangement of these elements is determined on the basis of the appropriate values derived from the analysis for polarization-independency. A transmission loss characteristic, which is most important in practical use of the optical isolator, is maintained at an excellent level even in presence of variation in temperature and wavelength and in presence of fluctuation in working precision. Deterioration of various isolator properties can be avoided.

2 Claims, 12 Drawing Sheets

OPTICAL ISOLATOR OPERATING INDEPENDENT OF POLARIZATION OF AN INCIDENT BEAM

This application is a Continuation of application Ser. No. 07/898,033, filed Jun. 12, 1992 now abandoned.

BACKGROUND OF THE INVENTION

As known in the art, a semiconductor laser or a gas laser having a wavelength range between 0.6–0.8 μm is often used as a light source in an optical system such as an optical communication system, an optical measurement system, and a magneto-optical disk. An outgoing light beam emitted from the laser is partially fed back to the laser itself as a return light beam to result in wavelength fluctuation and a noise. In this connection, an optical isolator is put into practical use to cut off such return light beam resulting in a noise.

A conventional optical isolator of the type described includes a single crystal birefringent element and a Faraday rotator. For use as the Faraday rotator, proposal is made of a semimagnetic semiconductor represented by a general formula of $Cd_{1-x}Mn_xTe$ (where $0 < x \leq 1$).

The conventional optical isolator generally comprises a combination of three or four birefringent elements and two Faraday rotators at most. As one of such optical isolators comprising a plurality of birefringent elements and a plurality of Faraday rotators, a polarization-independent optical isolator is known.

In the conventional polarization-independent optical isolator, isolator characteristics tend to deteriorate in case when the Faraday rotators per se have characteristic variation due to temperature change or characteristic fluctuation due to working precision or when fluctuation occurs in an oscillation wavelength of a laser used as a light source. In the current status of the art, any appropriate technical measure is not proposed to avoid such deterioration in the isolator characteristics.

SUMMARY OF THE INVENTION

In order to solve the above-mentioned disadvantage, it is an object of the present invention to provide a polarization-independent optical isolator which comprises a plurality of birefringent elements and a plurality of Faraday rotators and which is operable independent of a polarization direction of an incident light beam.

According to this invention, there is provided a polarization-independent optical isolator comprising an arrangement of four birefringent elements having birefringence and three Faraday rotators, wherein the birefringent elements and the Faraday rotators are arranged along a light transmitting direction in the order of a first birefringent element, a first Faraday rotator, a second birefringent element, a second Faraday rotator, a third birefringent element, a third Faraday rotator, and a fourth birefringent element, the first and the second birefringent elements providing polarization walk-off directions inclined at 45° to each other within a plane perpendicular to a travelling light beam and polarization walk-off distances equal to each other, the third and the fourth birefringent elements providing polarization walk-off distances equal to each other, the ratio in the polarization walk-off distances of the third and the fourth birefringent elements to the first and the second birefringent elements being 0.4142:1, the first, the second, and the third Faraday rotators providing a rotation angle of 45° for a polarization direction of the travelling light beam. According to this invention, in the above-mentioned polarization-independent optical isolator, the ratio in the polarization walk-off distances of the third and the fourth birefringent elements to the first and the second birefringent elements may be changed to 1:0.4142.

According to this invention, there is also provided a polarization-independent optical isolator comprising an arrangement of four birefringent elements having birefringence and three Faraday rotators, wherein the birefringent elements and the Faraday rotators are arranged along a light transmitting direction in the order of a first birefringent element, a first Faraday rotator, a second birefringent element, a second Faraday rotator, a third birefringent element, a third Faraday rotator, and a fourth birefringent element, the first and the second birefringent elements providing polarization walk-off directions inclined at 45° to each other within a plane perpendicular to a travelling light beam, the first and the fourth birefringent elements providing polarization walk-off distances equal to each other, the second and the third birefringent elements providing polarization walk-off distances equal to each other, the ratio in the polarization walk-off distances of the second and the third birefringent elements to the first and the fourth birefringent elements being 1:0.4142, the first, the second, and the third Faraday rotators providing a rotation angle of 45° for a polarization direction of the travelling light beam.

According to this invention, there is also provided an optical isolator comprising a first birefringent element, a first Faraday rotator, a second birefringent element, a second Faraday rotator, a third birefringent element, a third Faraday rotator, and a fourth birefringent element arranged in this order along a light transmitting direction, the first and the second birefringent elements providing polarization walk-off directions inclined at 45° to each other within a plane perpendicular to a travelling light beam, the ratio in the polarization walk-off distances of the first and the second birefringent elements being 1/0.4142, the third and the fourth birefringent elements providing polarization walk-off directions inclined at 45° to each other within a plane perpendicular to the travelling light beam, the ratio in the polarization walk-off distances of the third and the fourth birefringent elements being 0.4142/1, the first, the second, and the third Faraday rotators providing a rotation angle of 45° for a polarization direction of the travelling light beam.

DESCRIPTION OF THE PREFERRED EMBODIMENT

Figure 1:
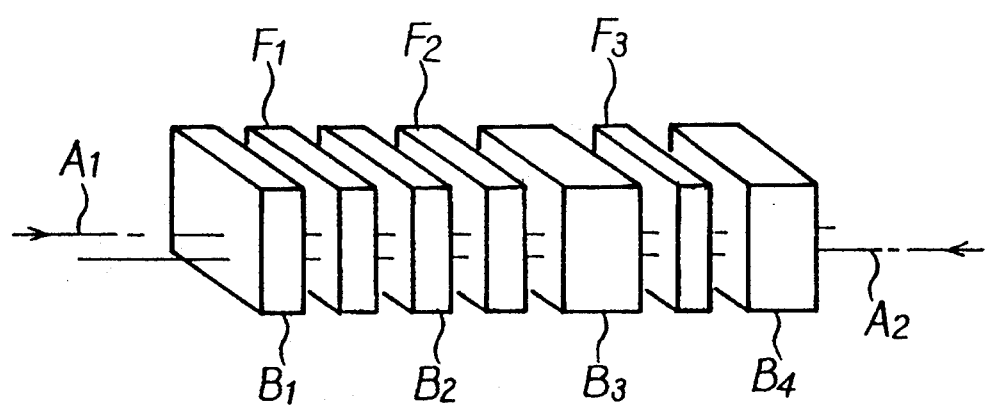
FIG. 1 is a perspective view illustrating a main portion of a polarization-independent optical isolator according to a first embodiment of this invention.

FIG. 1 is a perspective view of a main portion of a polarization-independent optical isolator according to a first embodiment of this invention. In the figure, a light transmitting direction of the optical isolator is denoted by A1 and hereinafter called a forward direction. On the other hand, an anti-transmitting direction is denoted by A2 and hereinafter called a backward direction.

Birefringent elements B1, B2, B3, and B4 are made of a rutile single crystal. Faraday rotators F1, F2, and F3 are made of a rare-earth bismuth iron garnet single crystal. Each of the birefringent elements B1, B2, B3, and B4 is formed so that a crystal axis and an element surface are inclined at substantially 48° to each other. The birefringent elements B1 and B2 have a thickness of 0.414 mm while the birefringent elements B3 and B4 have a thickness of 1.00 mm.

Figure 2A:
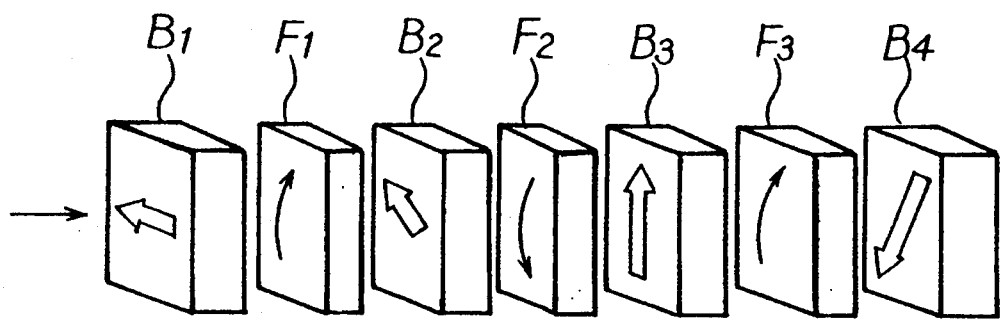
FIGS. 2a and 2b are for describing an arrangement of polarization walk-off directions and polarization walk-off distances of birefringent elements in the main portion of the polarization-independent optical isolator shown in FIG. 1 when viewed along a forward direction, FIGS. 2a and 2b showing cases where a forward-travelling light beam and a backward-travelling light beam are dealt with, respectively.
Figure 2B:
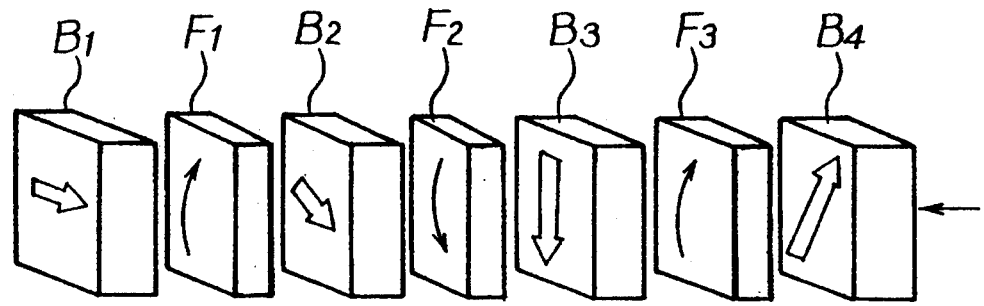

FIGS. 2a and 2b are for describing an arrangement of polarization walk-off directions (depicted by white arrows in the figure) and polarization walk-off distances of the birefringent elements when viewed along the forward direction. It is noted here that an incident light beam incident to each birefringent element is split into two polarization components (an ordinary ray and an extraordinary ray) to be emitted as outgoing light beams. One of the split rays (extraordinary ray) walks off from the other split ray (ordinary ray) in a polarization walk-off direction. A distance between two polarization components at an outgoing end of each birefringent element is called a polarization walk-off distance.

FIG. 2a is for describing a case of a forward-travelling light beam. The birefringent element B1 provides a polarization walk-off direction towards the left (the direction of the hour hand when the clock shows nine o'clock) and a polarization walk-off distance of 41.4 $\mu$m. The birefringent element B2 provides a polarization walk-off direction towards the upper left (the direction of the hour hand when the clock shows ten thirty) and a polarization walk-off distance of 41.4 $\mu$m. The birefringent element B3 provides a polarization walk-off direction of upwards (the direction of the hour hand when the clock shows twelve o'clock) and a polarization walk-off distance of 100 $\mu$m. The birefringent element B4 provides a polarization walk-off direction towards the lower left (the direction of the hour hand when the clock shows seven thirty) and a polarization walk-off distance of 100 $\mu$m.

On the other hand, FIG. 2b is for describing a case of a backward-travelling light beam. In this case, polarization walk-off directions are opposite to those of the forward-travelling light beam while polarization walk-off distances; are equal to those of the forward-travelling light beam.

The Faraday rotators F1, F2, and F3 are magnetized in a saturation state by a permanent magnet arranged at a periphery of the Faraday rotators so as to rotate a polarization direction by 45° for a light beam having a wavelength of 1.55 $\mu$m. Rotation directions viewed along the forward direction are shown by black arrows in FIGS. 2a and 2b. The Faraday rotators F1 and F3 provide a clockwise rotation while the Faraday rotator F2 provides a counterclockwise rotation.

Figure 3:
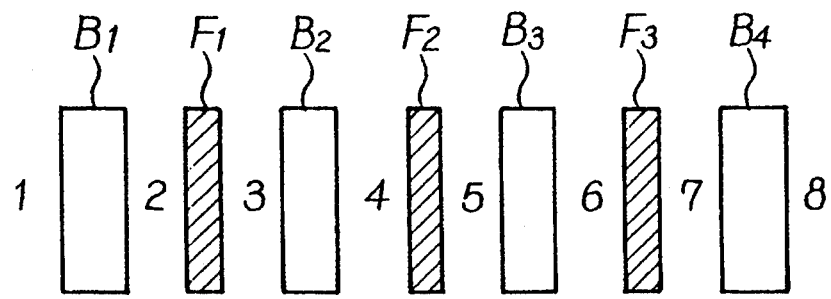
FIG. 3 is a view for describing identification numbers assigned to positions between the adjacent elements in the main portion of the polarization-independent optical isolator shown in FIG. 1.

Next referring to FIGS. 3 and 4, description will be made as regards polarization walk-off in case of a forward-travelling light beam. FIG. 3 shows identification numbers assigned to positions between the adjacent elements. Specifically, a position 1 is an input location along the forward direction (or an output location along the backward direction) with respect to the birefringent element B1. A position 2 is between the birefringent element B1 and the Faraday rotator F1. A position 3 is between the Faraday rotator F1 and the birefringent element B2. A position 4 is between the birefringent element B2 and the Faraday rotator F2. A position 5 is between the Faraday rotator F2 and the birefringent element B3. A position 6 is between the birefringent element B3 and the Faraday rotator F3. A position 7 is between the Faraday rotator F3 and the birefringent element B4. A position 8 is an output location along the forward direction (or an input location along the backward direction) with respect to the birefringent element B4.

Figure 4A:
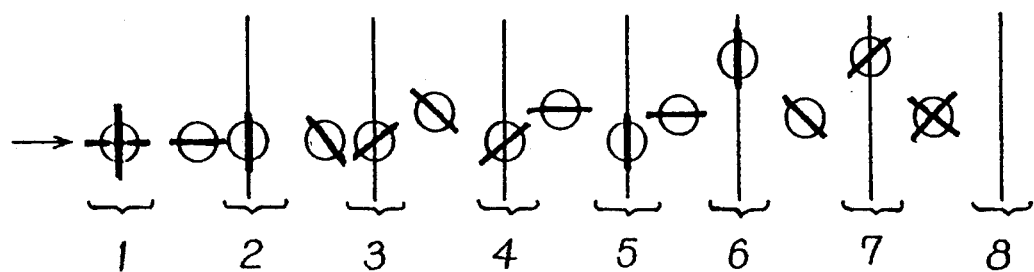
FIGS. 4a and 4b show spatial walk-off of polarization components in the main portion of the polarization-independent optical isolator shown in FIG. 1 when viewed along the forward direction, FIGS. 4a and 4b showing cases where a forward-travelling light beam and a backward-travelling light beam are dealt with, respectively.

FIG. 4a shows spatial walk-off of polarization components of the forward-travelling light beam at the positions 1 through 8 when viewed along the forward direction.

Specifically, at the position 1, an incident light beam in a non-polarization state is incident from a single point along the forward direction and is represented as a combination of two polarization components perpendicular to each other. At the position 2, a horizontal polarization component (an extraordinary ray component travelling through the rutile crystal) walks off by the birefringent element B1 by 41.4 $\mu$m in a leftward direction while a vertical polarization component (an ordinary ray component travelling through the rutile crystal) remains in its original position. At the position 3, both of the polarization components are rotated by the Faraday rotator F1 by 45° in a clockwise direction. At the position 4, only one polarization component that is inclined at 45° clockwise from a horizontal direction walks off by the birefringent element B2 by 41.4 $\mu$m in an upper leftward direction. At the position 5, both of the polarization components are rotated-by the Faraday rotator F2 by 45° in a counterclockwise direction. At the position 6, only the vertical polarization component walks off by the birefringent element B3 by 100 $\mu$m in an upward direction. At the position 7, both of the polarization components are rotated by the Faraday rotator F3 by 45° in a clockwise direction. At the position 8, only one component that is inclined at 45° counterclockwise from a horizontal direction walks off by the birefringent element B4 by 100 $\mu$m in a lower leftward direction to become coincident with other component perpendicular thereto.

Thus, the forward-travelling light beam is emitted from the optical isolator element without separation into polarization components.

Figure 4B:
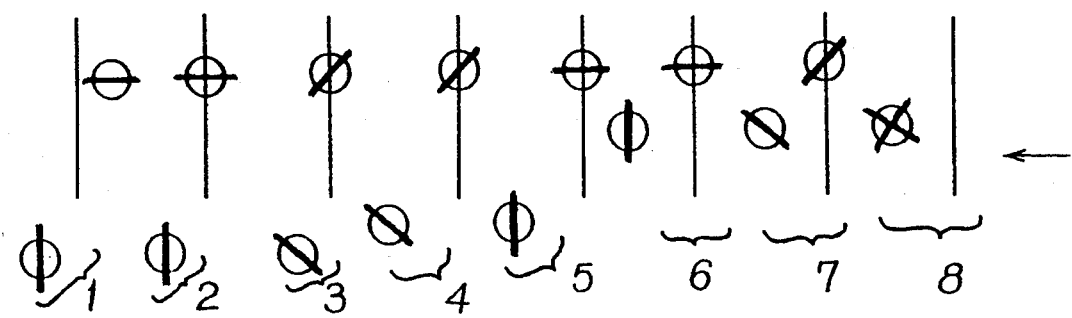

FIG. 4b shows spatial walk-off of polarization components of the backward-travelling light beam at the positions 1 through 8 when viewed along the forward direction.

Specifically, at the position 8, an incident light beam in a non-polarization state is incident along the backward direction and is represented by a combination of two polarization components perpendicular to each other. At the position 7, only one polarization component that is inclined at 45° counterclockwise from a horizontal direction walks off by the birefringent element B4 by 100 $\mu$m in an upper rightward direction. At the position 6, both of the polarization components are rotated by the Faraday rotator F3 by 45° in the clockwise direction. At the position 5, only the vertical polarization component walks off by the birefringent element B3 by 100 $\mu$m in a downward direction. At the position 4, both of the polarization components are rotated by the Faraday rotator F2 by 45° in the counterclockwise direction. At the position 3, only one polarization component that is inclined at 45° clockwise from the horizontal direction walks off by the birefringent element B2 by 41.4 $\mu$m in a lower rightward direction. At the position 2, both of the polarization components are rotated by the Faraday rotator F1 by 45° in the clockwise direction. At the position 1, the horizontal polarization component walks off by the birefringent element B1 by 41.4 $\mu$m in a rightward direction.

It is understood that the backward-travelling light beam passes through the optical isolator element to be separated into the polarization components perpendicular to each other and that both of the polarization components never return to an incident point at the position 1 shown in FIG. 4a.

Figure 5:
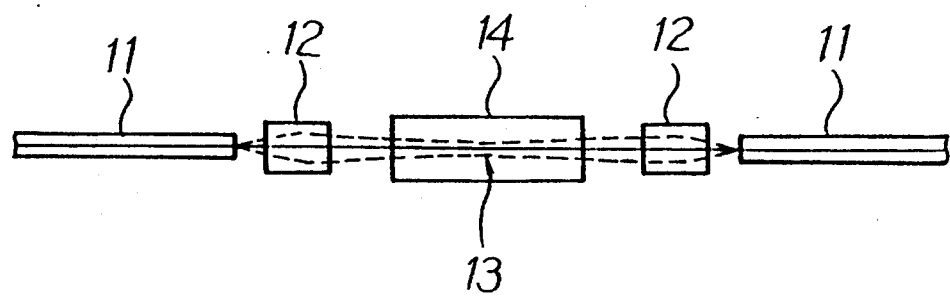
FIG. 5 is a plan view of a basic structure of the polarization-independent optical isolator according to the first embodiment of this invention.

FIG. 5 is a plan view of a basic structure of the polarization-independent optical isolator according to the first embodiment of this invention. An isolator element 14 comprising the three Faraday rotators and the four birefringent elements is located at a center. At both sides of the optical isolator element 14, GRIN lenses 12 and single mode fibers 11 with a PC connector are arranged. The single mode fibers 11 are located outside the GRIN lenses 12. A laser beam having a wavelength of 1.55 $\mu$m is emitted from the single mode fiber 11 and is converged by the GRIN lens 12 to a diameter of 60 $\mu$m. These elements are arranged so that a converging position 13 is substantially coincident with a center position of the isolator element 14. An antireflection coating film is applied on a light transmission surface of each of these optical elements.

When the polarization-independent optical isolator of the above-mentioned structure was supplied with a semiconductor laser beam having an oscillation wavelength of 1.55 $\mu$m which travels from the single mode fiber 11 through the isolator element 14 along the forward directions the transmission loss was equal to 1.5 dB. In case of travelling in the backward direction, the transmission loss was equal to 64 dB.

When the wavelength of the laser beam was changed within a range between 1.51–1.59 ($\mu$m), variation in the transmission loss did not exceed 0.5 dB. In addition, when the temperature of the polarization-independent optical isolator was changed between 0–60 (°C.), variation in the transmission loss was not greater than 0.5 dB.

For comparison, a similar experiment was carried out with a conventional polarization-independent optical isolator under those conditions. With the above-mentioned change in the various conditions, the transmission loss exceeded 5 dB.

When the polarization direction of the incident light beam was changed by 180° in the polarization-independent optical isolator according to this invention, variation in the transmission loss was equal to 0.1 dB and 0.5 dB in the forward and the backward directions, respectively.

Figure 6A:
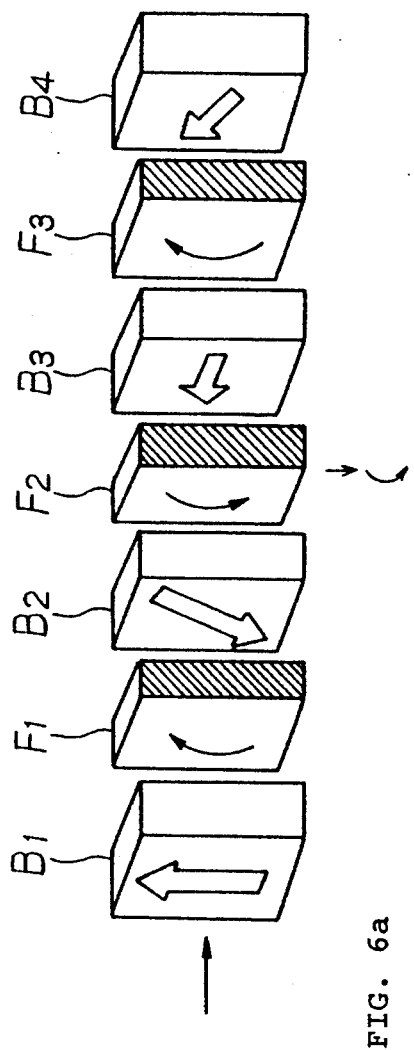
FIGS. 6a and 6b are for describing an arrangement of polarization walk-off directions and polarization walk-off distances of birefringent elements in a main portion of a polarization-independent optical isolator according to a second embodiment of this invention when viewed along a forward direction, FIGS. 6a and 6b showing cases where a forward-travelling light beam and a backward-travelling light beam are dealt with, respectively.
Figure 6B:
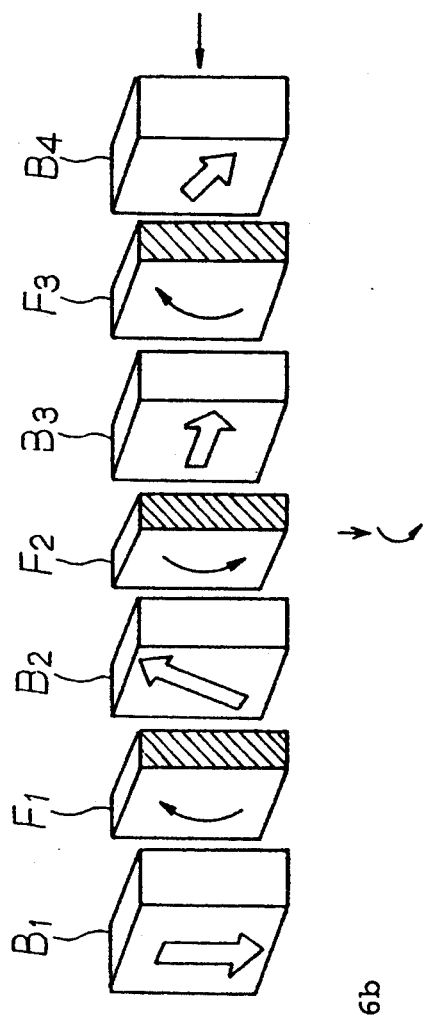

Description will now proceed to a polarization-independent optical isolator according to a second embodiment of this invention. This polarization-independent optical isolator has a structure basically similar to that of the first embodiment described above. However, the birefringent elements B1 and B2 has a thickness of 1.00 mm while the birefringent elements B3 and B4 has a thickness of 0.414 mm. FIGS. 6a and 6b are for describing an arrangement of polarization walk-off directions (depicted by white arrows in the figure) and polarization walk-off distances of the birefringent elements in this embodiment when viewed along the forward direction.

FIG. 6a is for describing a case of a forward-travelling light beam. The birefringent element B1 provides a polarization walk-off direction of upwards (the direction of the hour hand when the clock shows twelve o'clock) and a polarization walk-off distance of 100 μm. The birefringent element B2 provides a polarization walk-off direction towards the lower left (the direction of the hour hand when the clock shows seven thirty) and a polarization walk-off distance of 100 μm. The birefringent element B3 provides a polarization walk-off direction towards the left (the direction of the hour hand when the clock shows nine o'clock) and a polarization walk-off distance of 41.4 μm. The birefringent element B4 provides a polarization walk-off direction towards the upper left (the direction of the hour hand when the clock shows ten thirty) and a polarization walk-off distance of 41.4 μm.

On the other hand, FIG. 6b is for describing a case of a backward-travelling light beam. In this case also, polarization walk-off directions are opposite to those of the forward-travelling light beam while polarization walk-off distances are equal to those of the forward-travelling light beam.

The Faraday rotators F1, F2, and F3 are magnetized in a saturation state by a permanent magnet arranged at a periphery of the Faraday rotators so as to rotate a polarization direction by 45° for a light beam having a wavelength of 1.55 μm. Rotation directions viewed along the forward direction are shown by black arrows in FIGS. 6a and 6b. The Faraday rotators F1 and F3 provide a clockwise rotation while the Faraday rotator F2 provides a counterclockwise rotation.

In this embodiment also, description will be made as regards spatial walk-off of the polarization components when viewed along the forward direction by the use of the identification numbers assigned to the positions between the adjacent elements as shown in FIG. 3.

Figure 7A:
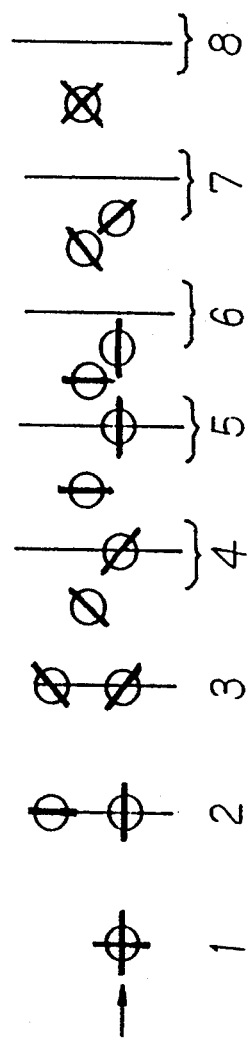
FIGS. 7a and 7b show spatial walk-off of polarization components at the numbered positions in FIG. 3 in the main portion of the polarization-independent optical isolator according to the second embodiment of this invention when viewed along the forward direction, FIGS. 7a and 7b showing cases where a forward-travelling light beam and a backward-travelling light beam are dealt with, respectively.

FIG. 7a shows spatial walk-off of polarization components of the forward-travelling light beam at the positions 1 through 8 when viewed along the forward direction.

Specifically, at the position 1, an incident light beam in a non-polarization state is incident from a single point along the forward direction and is represented as a combination of two polarization components perpendicular to each other. At the position 2, a vertical polarization component (an extraordinary ray component travelling through the rutile crystal) walks off by the birefringent element B1 by 100 μm in an upward direction while a horizontal polarization component (an ordinary ray component travelling through the rutile crystal) remains in its original position. At the position 3, both of the polarization components are rotated by the Faraday rotator F1 by 45° in a clockwise direction. At the position 4, only one component that is inclined at 45° clockwise from a vertical direction walks off by the birefringent element B2 by 100 μm in a lower leftward direction. At the position 5, both of the polarization components are rotated by the Faraday rotator F2 by 45° in a counterclockwise direction. At the position 6, only the horizontal polarization component walks off by the birefringent element B3 by 41.4 μm in a leftward direction. At the position 7, both of the polarization components are rotated by the Faraday rotator F3 by 45° in a clockwise direction. At the position 8, only one component that is inclined at 45° counterclockwise from a horizontal direction walks off by the birefringent element B4 by 41.4 μm in an upper leftward direction to become coincident with other component perpendicular thereto.

Thus, the forward-travelling light beam is emitted from the optical isolator element without separation into polarization components.

Figure 7B:
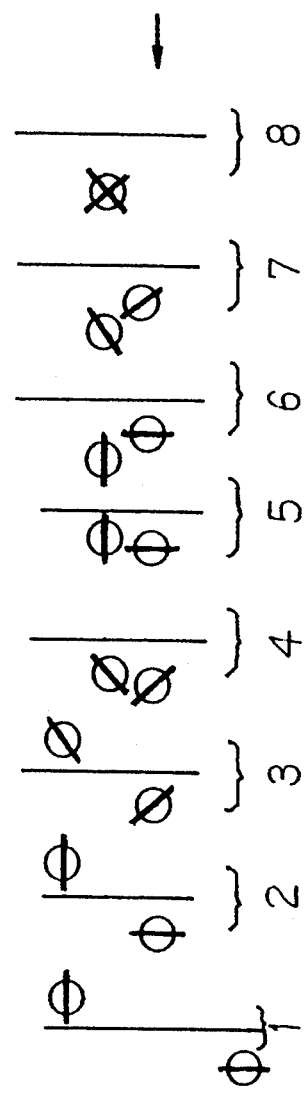

FIG. 7b shows spatial walk-off of polarization components of the backward-travelling light beam at the positions 1 through 8 when viewed along the forward direction.

Specifically, at the position 8, an incident light beam in a non-polarization state is incident along the backward direction and is represented by a combination of two polarization components perpendicular to each other. At the position 7, only one polarization component that is inclined at 45° counterclockwise from a horizontal direction walks off by the birefringent element B4 by 41.4 μm in a lower rightward direction. At the position 6, both of the polarization components are rotated by the Faraday rotator F3 by 45° in the clockwise direction. At the position 5, only the horizontal polarization component walks off by the birefringent element B3 by 41.4 μm in a rightward direction. At the position 4, both of the polarization components are rotated by the Faraday rotator F2 by 45° in the counterclockwise direction. At the position 3, only one component that is inclined at 45° clockwise from the vertical direction walks off by the birefringent element B2 by 100 μm in an upper rightward direction. At the position 2, both of the polarization components are rotated by the Faraday rotator F1 by 45° in the clockwise direction. At the position 1, the vertical polarization component walks off by the birefringent element B1 by 100 μm in a downward direction.

It is understood that the backward-travelling light beam passes through the optical isolator element to be separated into the polarization components perpendicular to each other and that both of the polarization components never return to an incident point at the position 1 shown in FIG. 7a.

When the above-described isolator element comprising three Faraday rotators and four birefringent elements is formed into the polarization-independent optical isolator as shown in FIG. 5, similar effect is obtained as the foregoing embodiment.

Figure 8A:
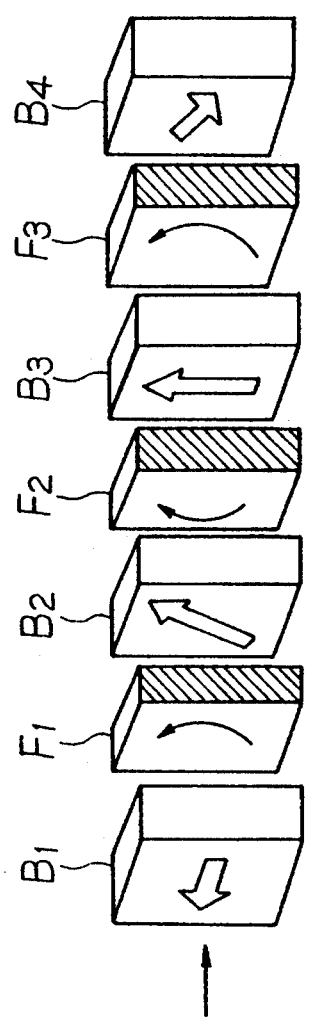
FIGS. 8a and 8b are for describing an arrangement of polarization walk-off directions and polarization walk-off distances of birefringent elements in a main portion of a polarization-independent optical isolator according to a third embodiment of this invention when viewed along a forward direction, FIGS. 8a and 8b showing cases where a forward-travelling light beam and a backward-travelling light beam are dealt with, respectively.
Figure 8B:
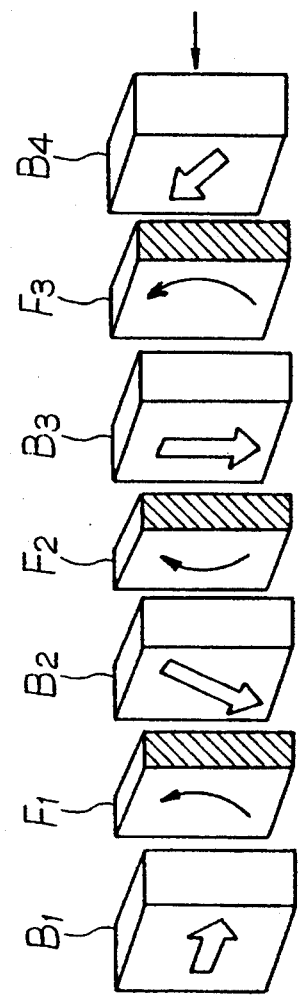

Description will now proceed to a polarization-independent optical isolator according to a third embodiment of this invention. This polarization-independent optical isolator also has a structure basically similar to those of the first and the second embodiments described above. However, the birefringent elements B1 and B4 has a thickness of 0.414 mm while the birefringent elements B2 and B3 has a thickness of 1.00 mm. FIGS. 8a and 8b are for describing an arrangement of polarization walk-off directions (depicted by white arrows in the figure) and polarization walk-off distances of the birefringent elements in this embodiment when viewed along the forward direction.

FIG. 8a is for describing a case of a forward-travelling light beam. The birefringent element B1 provides a polarization walk-off direction towards the left (a direction of the hour hand when the clock shows nine o'clock) and a polarization walk-off distance of 41.4 μm. The birefringent element B2 provides a polarization walk-off direction towards the upper right (a direction of the hour hand when the clock shows one thirty) and a polarization walk-off distance of 100 μm. The birefringent element B3 provides a polarization walk-off direction of upwards (a direction of the hour hand when the clock shows twelve o'clock) and a polarization walk-off distance of 100 μm. The birefringent element B4 provides a polarization walk-off direction towards the lower right (a direction of the hour hand when the clock shows four thirty) and a polarization walk-off distance of 41.4 μm.

On the other hand, FIG. 8b is for describing a case of a backward-travelling light beam. In this case also, polarization walk-off directions are opposite to those of the forward-travelling light beam while polarization walk-off distances are equal to those of the forward-travelling light beam. The Faraday rotators F1, F2, and F3 are magnetized in a saturation state by a permanent magnet arranged at a periphery of the Faraday rotators so as to rotate a polarization direction by 45° for a light beam having a wavelength of 1.55 μm. Rotation directions viewed along the forward direction are shown by black arrows in FIGS. 8a and 8b. The Faraday rotators F1 and F3 provide a counterclockwise rotation while the Faraday rotator F2 provides a clockwise rotation.

In this embodiment also, description will be made as regards spatial walk-off of the polarization components when viewed along the forward direction by the use of the identification numbers assigned to the positions between the adjacent elements as shown in FIG. 3.

Figure 9A:
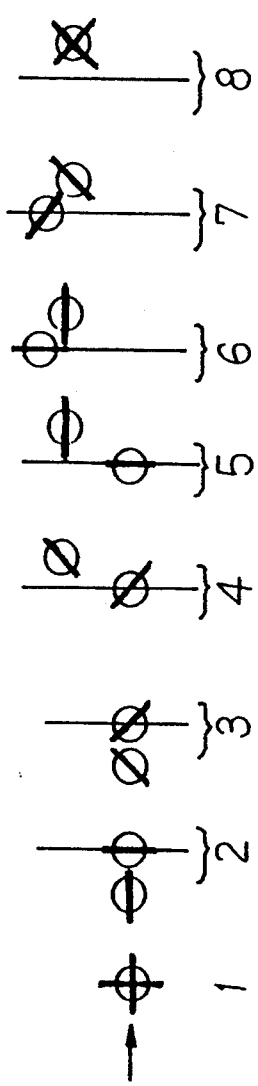
FIGS. 9a and 9b show spatial walk-off of polarization components at the numbered positions shown in FIG. 8 in the main portion of the polarizations independent optical isolator according to the third embodiment of this invention when viewed along the forward direction, FIG. 9a and FIG. 9b showing cases where a forward-travelling light beam and a backward-travelling light beam are dealt with, respectively.

FIG. 9a shows spatial walk-off of polarization components of the forward-travelling light beam at the positions 1 through 8 when viewed along the forward direction.

Specifically, at the position 1, an incident light beam in a non-polarization state is incident from a single point along the forward direction and is represented as a combination of two polarization components perpendicular to each other. At the position 2, a horizontal polarization component (an extraordinary ray component travelling through the rutile crystal) walks off by the birefringent element B1 by 41.4 μm in an upward direction while a vertical polarization component (an ordinary ray component travelling through the rutile crystal) remains in its original position. At the position 3, both of the polarization components are rotated by the Faraday rotator F1 by 45° in a counterclockwise direction. At the position 4, only one component that is inclined at 45° counterclockwise from a horizontal direction walks off by the birefringent element B2 by 100 μm in an upper rightward direction. At the position 5, both of the polarization components are rotated by the Faraday rotator F2 by 45° in a clockwise direction. At the position 6, only the vertical polarization component walks off by the birefringent element B3 by 100 μm in an upward direction. At the position 7, both of the polarization components are rotated by the Faraday rotator F3 by 45° in a counterclockwise direction. At the position 8, only one component that is inclined at 45° clockwise from a horizontal direction walks off by the birefringent element B4 by 41.4 μm in a lower rightward direction to become coincident with other component perpendicular thereto.

Thus, the forward-travelling light beam is emitted from the optical isolator element without separation into polarization components.

Figure 9B:
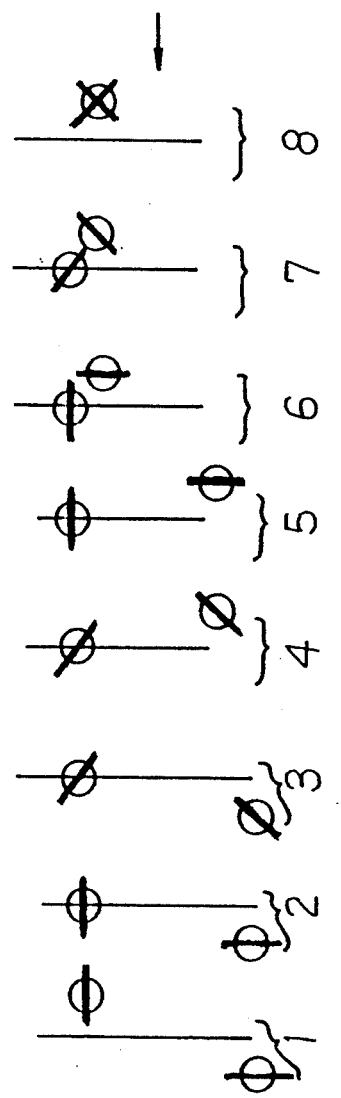

FIG. 9b shows spatial walk-off of polarization components of the backward-travelling light beam at the positions 1 through 8 when viewed along the forward direction.

Specifically, at the position 8, an incident light beam in a non-polarization state is incident along the backward direction and is represented by a combination of two polarization components perpendicular to each other. At the position 7, only one polarization component that is inclined at 45° clockwise from a horizontal direction walks off by the birefringent element B4 by 41.4 μm in an upper leftward direction. At the position 6, both of the polarization components are rotated by the Faraday rotator F3 by 45° in the counterclockwise direction. At the position 5, only the vertical polarization component walks off by the birefringent element B3 by 100 μm in a rightward direction. At the position 4, both of the polarization components are rotated by the Faraday rotator F2 by 45° in the clockwise direction. At the position 3, only one component that is inclined at 45° counterclockwise from the horizontal direction walks off by the birefringent element B2 by 100 μm in a lower-leftward direction. At the position 2, both of the polarization components are rotated by the Faraday rotator F1 by 45° in the counterclockwise direction. At the position 1, the vertical polarization component walks off by the birefringent element B1 by 41.4 μm in a rightward direction.

It is understood that the backward-travelling light beam passes through the optical isolator element to be separated into the polarization components perpendicular to each other and that both of the polarization components never return to an incident point at the position 1 shown in FIG. 9a.

When the above-described isolator element comprising three Faraday rotators and four birefringent elements is formed into the polarization-independent optical isolator as shown in FIG. 5, similar effect is obtained as the foregoing embodiment.

Figure 10:
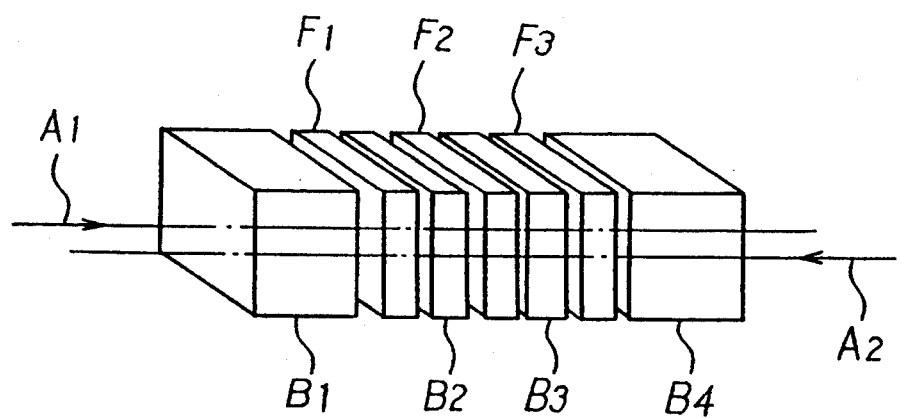
FIG. 10 is a perspective view illustrating a main portion of a polarization-independent optical isolator according to a fourth embodiment of this invention.

Next, description will proceed to an optical isolator according to a fourth embodiment of this invention. FIG. 10 is a perspective view of an optical isolator according to the fourth embodiment of this invention. In FIG. 10 also, a light transmitting direction (hereinafter called a forward direction) of the optical isolator is denoted by A1. An anti-transmitting direction (hereinafter called a backward direction) is denoted by A2. Birefringent elements B1, B2, B3, and B4 are made of a rutile single crystal. Faraday rotators F1, F2, and F3 are made of a terbium bismuth iron garnet single crystal. Each of the birefringent elements B1 through B4 is formed so that a crystal axis and an element surface are inclined at substantially 48° to each other. The birefringent elements B1 and B4 have a thickness of 1 mm while the birefringent elements B2 and B3 have a thickness of 0.414 mm.

Figure 11A:
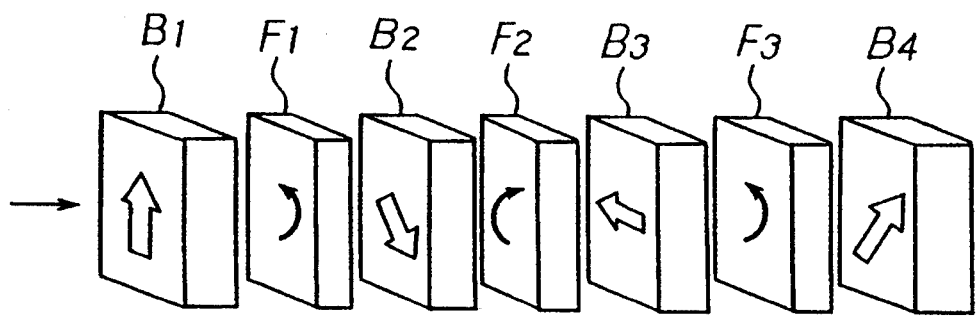
FIGS. 11a and 11b are for describing an arrangement of polarization walk-off directions and polarization walk-off distances of birefringent elements in the main portion of the polarization-independent optical isolator shown in FIG. 10 when viewed along a forward direction, FIGS. 11a and 11b showing cases where a forward-travelling light beam and a backward-travelling light beam are dealt with, respectively.
Figure 11B:
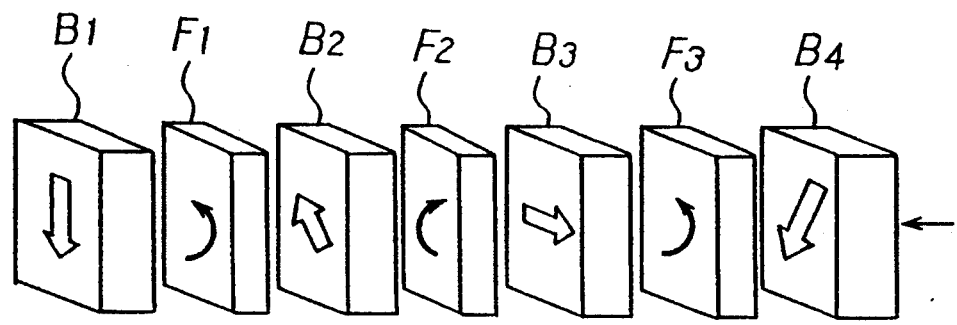

The birefringent elements B1, B2, B3, and B4 provide polarization walk-off directions and polarization walk-off distances for a forward-travelling light beam and a backward-travelling light beam as depicted by white arrows an FIGS. 11a and 11b, respectively.

FIG. 11a shows a case of the forward-travelling light beam. The birefringent element B1 provides the polarization walk-off direction of the direction of the hour hand when the clock shows twelve o'clock and the polarization walk-off distance of 100 μm. The birefringent element B2 provides the direction of the hour hand when the clock shows four thirty and the distance of 41.4 μm. The birefringent element B3 provides the direction of the hour hand when the clock shows nine o'clock and the distance of 41.4 μm. The birefringent element B4 provides the direction of the hour hand when the clock shows one thirty and the distance of 100 μm. FIG. 11b shows a case of the backward-travelling light beam. The polarization walk-off distances are similar to those of the forward-travelling light beam while the polarization walk-off directions are opposite to those of the forward-travelling light beam.

The Faraday rotators F1, F2, and F3 are magnetized in a saturation state by a permanent magnet arranged at a periphery of the Faraday rotators F1, F2, and F3 so as to rotate a polarization direction by 45° for a light beam having a wavelength of 1.3 μm. Rotation directions viewed along the forward direction are shown by arrows in FIG. 11. The Faraday rotators F1 and F3 provide a counterclockwise rotation while the Faraday rotator F2 provides a clockwise rotation.

Figure 12:
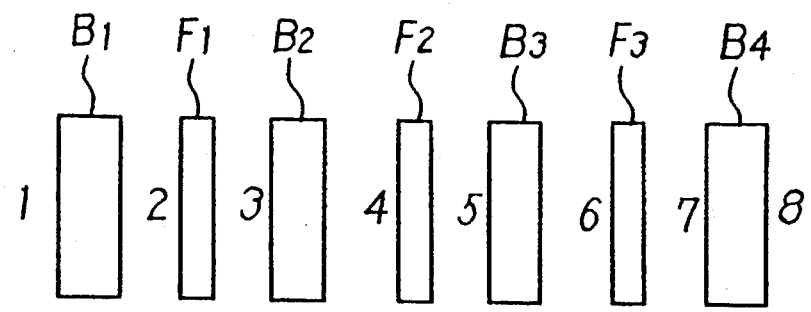
FIG. 12 is a view for describing identification numbers assigned to positions between the adjacent elements in the main portion of the polarization-independent optical isolator shown in FIG. 10.
Figure 13A:
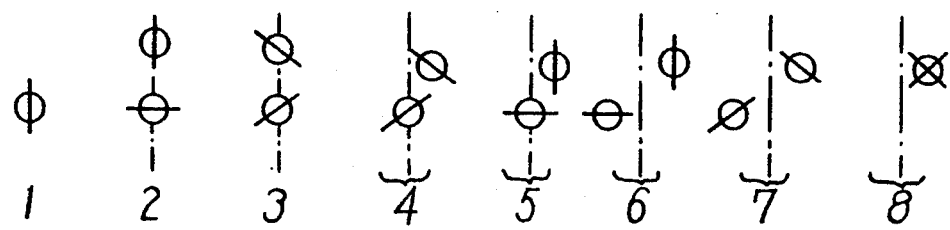
FIGS. 13a and 13b show spatial walk-off of polarization components in the main portion of the polarization-independent optical isolator shown in FIG. 10 when viewed along the forward direction, FIGS. 13a and 13b showing cases where a forward-travelling light beam and a backward-travelling light beam are dealt with, respectively.
Figure 13B:
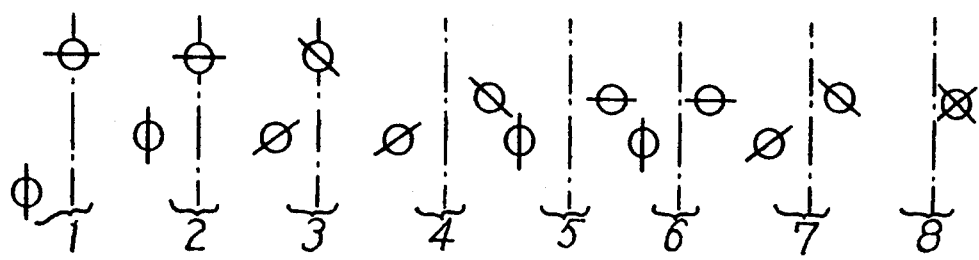

Referring to FIGS. 12, 13a, and 13b, description will be made as regards spatial walk-off of polarization components for the forward- and the backward-travelling light beams.

Referring to FIG. 12 similar to FIG. 3, a position 1 is an input location along the forward direction with respect to the birefringent element B1. A position 2 is between the birefringent element B1 and the Faraday rotator F1. A position 3 is between the Faraday rotator F1 and the birefringent element B2. A position 4 is between the birefringent element B2 and the Faraday rotator F2. A position 5 is between the Faraday rotator F2 and the birefringent element B3. A position 6 is between the birefringent element B3 and the Faraday rotator F3. A position 7 is between the Faraday rotator F3 and the birefringent element B4. A position 8 is an output location along the forward direction with respect to the birefringent element B4.

FIG. 13a shows spatial walk-off of polarization components of the forward-travelling light beam at the positions 1 through 8 when viewed along the forward direction.

At the position 1, an incident light beam in a non-polarization state is incident from a single point along the forward direction and is represented as a combination of two polarization components perpendicular to each other. At the position 2, a vertical polarization component (an extraordinary ray component through the rutile crystal) walks off by the birefringent element B1 by 100 μm in an upward direction while a horizontal polarization component (an ordinary ray component through the rutile crystal) remains in its original position. At the position 3, both of the polarization components are rotated by the Faraday rotator F1 by 45° in a counterclockwise direction. At the position 4, only one polarization component that is inclined at 45° clockwise from a horizontal direction walks off by the birefringent element B2 by 41.4 μm in the direction of the hour hand when the clock shows four thirty. At the position 5, both of the polarization components are rotated by the Faraday rotator F2 by 45° in a clockwise direction. At the position 6, only the horizontal polarization component walks off by the birefringent element B3 by 41.4 μm in the direction of the hour hand when the clock shows nine o'clock. At the position 7, both of the polarization components are rotated by the Faraday rotator F3 by 45° in a counterclockwise direction. At the position 8, only one polarization component that is inclined at 45° clockwise from a horizontal direction walks off by the birefringent element B4 by 100 μm in the direction of the hour hand when the clock shows one thirty to become coincident with other component perpendicular thereto. As a result, the forward-travelling light beam travels through the optical isolator element without separation into polarization components.

FIG. 13b shows spatial walk-off of polarization components of the backward-travelling light beam at the positions 1 through 8 when viewed along the forward direction.

At the position 8, an incident light beam in a non-polarization state is incident from a single point along the backward direction and is represented by a combination of two polarization components perpendicular to each other. At the position 7, only one polarization component that is inclined at 45° clockwise from a horizontal direction walks off by the birefringent element B4 by 100 μm in the direction of the hour hand when the clock shows four thirty. At the position 6, both of the polarization components are rotated by the Faraday rotator F3 by 45° in the counterclockwise direction. At the position 5, only the horizontal polarization component walks off by the birefringent element B3 by 41.4 μm in the direction of the hour hand when the clock shows three o'clock. At the position 4, both of the polarization components are rotated by the Faraday rotator F2 by 45° in the clockwise direction. At the position 3, only one polarization component that is inclined at 45° clockwise from the horizontal direction walks off by the birefringent element B2 by 41.4 μm in the direction of the hour hand when the clock shows ten thirty. At the position 2, both of the polarization components are rotated by the Faraday rotator F1 by 45° in the counterclockwise direction. At the position 1, only the vertical polarization component walks off by the birefringent element B1 by 100 μm in the direction of the hour hand when the clock shows six o'clock.

As a result, the backward-travelling light beam passes through the optical isolator element to be separated into the polarization components and both of the polarization components never return to an incident point at the position 1 shown in FIG. 13a.

Figure 14:
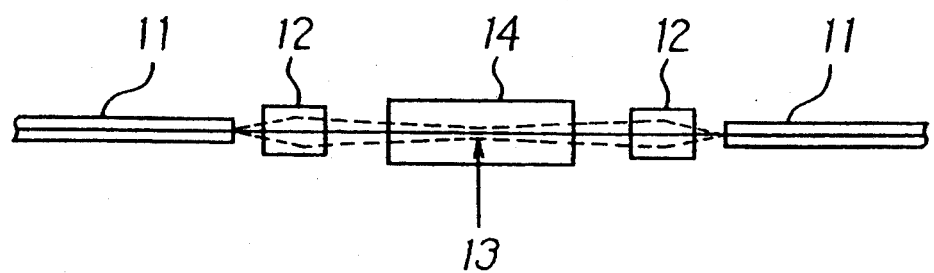
FIG. 14 is a plan view of a basic structure of the polarization-independent optical isolator according to the fourth embodiment of this invention.

As shown in FIG. 14, single mode fibers 11 with a PC connector and GRIN lenses 12 are arranged at both sides of an optical isolator element 14 according to a fourth embodiment of this invention. A laser beam having a wavelength of 1.55 μm is emitted from the single mode fiber 11 and is converged by the GRIN lens to a diameter of 60 μm. An arrangement of these elements are such that a converged position 13 is substantially coincident with a center position of the optical isolator 14.

An antireflection coating film for the light beam having a wavelength of 1.55 μm is applied on each of end surfaces of the single mode fibers 11, the GRIN lenses 12, the birefringent elements and the Faraday rotators forming the optical isolator 14.

The polarization-independent optical isolator of the above-mentioned structure was supplied with a semiconductor laser beam having an oscillation wavelength of 1.55 μm which travels from the single mode fiber 11 through the elements of the optical isolator along the forward direction. In this event, the transmission loss was equal to 1.5 dB. In case of travelling in the backward direction on the other hand, the transmission loss was equal to 64 dB. When the wavelength of the laser beam was changed within a range between 1.51–1.59 (μm), variation in the transmission loss was not observed. In addition, when the temperature of the isolator was changed between 0° C.–60° C., variation in the transmission loss was not observed. When the polarization direction of the incident light beam was changed by 180°, variation in the transmission loss was equal to 0.1 dB and 0.5 dB in the forward and the backward directions, respectively.

As described above, according to this invention, a combination of three Faraday rotators and four birefringent elements is used as an isolator element. An optical arrangement of the respective elements is determined on the basis of the appropriate values derived from the analysis for polarization-independency. According to this invention, there is provided a polarization-independent optical isolator which is excellent in practical use without deterioration in isolator properties even in presence of variation in temperature and wavelength or in presence of fluctuation in working precision.

What is claimed is:

1. A polarization-independent optical isolator in which polarization dispersion is suppressed, comprising:

four birefringent elements having birefringence; and
   three Faraday rotators; and wherein:
   said birefringent elements and said Faraday rotators are arranged along a light transmitting direction in the order of a first birefringent element, a first Faraday rotator, a second birefringent element, a second Faraday rotator, a third birefringent element, a third Faraday rotator, and a fourth birefringent element;
   said first, said second, said third, and said fourth birefringent elements providing polarization walk-off directions inclined at 45° to each other within a plane perpendicular to a travelling light beam;
   the ratio of polarization walk-off distances of said first, said second, said third and said fourth birefringent elements being 1:0.4142:0.4142:1; and
   said first, said second, and said third Faraday rotators providing a rotation angle of 45° for a polarization direction of said traveling light beam.

2. A polarization-independent optical isolator in which polarization dispersion is suppressed, comprising:

four birefringent elements having birefringence; and
   three Faraday rotators; and wherein:
   said birefringence elements and said Faraday rotators are arranged along a light transmitting direction in the order of a first birefringent element, a first Faraday rotator, a second birefringent element, a second Faraday rotator, a third birefringent element, a third Faraday rotator, and a fourth birefringent element;
   said first, said second, said third and said fourth birefringent elements providing polarization walk-off directions inclined at 45° to each other within a plane perpendicular to a travelling light beam;
   the ratio of polarization walk-off distances of said first, said second, said third and said fourth birefringent elements being 0.4142:1:1:0.4142; and
   said first, said second, and said third Faraday rotators providing a rotation angle at 45° for a polarization direction of said travelling light beam.

* * * * *